US009676406B1

(12) United States Patent
Kocurek et al.

(10) Patent No.: US 9,676,406 B1
(45) Date of Patent: Jun. 13, 2017

(54) SHOPPING CART HANDLE COVER

(71) Applicants: Mistie Kocurek, Bandera, TX (US); Sharon Robinson, Bandera, TX (US)

(72) Inventors: Mistie Kocurek, Bandera, TX (US); Sharon Robinson, Bandera, TX (US)

( * ) Notice: Subject to any disclaimer, the term of this patent is extended or adjusted under 35 U.S.C. 154(b) by 0 days.

(21) Appl. No.: 15/071,273

(22) Filed: Mar. 16, 2016

(51) Int. Cl.
*B62D 39/00* (2006.01)
*B62B 5/06* (2006.01)

(52) U.S. Cl.
CPC ................... *B62B 5/069* (2013.01)

(58) Field of Classification Search
CPC .................. B62B 5/069; B62B 5/06
See application file for complete search history.

(56) References Cited

U.S. PATENT DOCUMENTS

| 4,805,937 | A |   | 2/1989  | Boucher |              |
|-----------|---|---|---------|---------|--------------|
| D357,784  | S |   | 4/1995  | Ince    |              |
| 5,429,377 | A |   | 7/1995  | Duer    |              |
| 5,722,672 | A |   | 3/1998  | Frederick |            |
| 5,855,412 | A | * | 1/1999  | Smith ................... | B62B 3/1456 190/2 |
| 5,967,607 | A | * | 10/1999 | Waldroup ............... | B62B 3/144 297/219.12 |
| 6,065,764 | A |   | 5/2000  | Moseley |              |
| 6,206,471 | B1 | * | 3/2001 | McGowan .............. | B62B 3/144 297/219.12 |
| 6,237,998 | B1 | * | 5/2001 | Aprile ..................... | B62B 3/144 297/219.12 |
| 6,832,766 | B2 | * | 12/2004 | Stokes ................... | B62B 3/1456 150/154 |
| 7,052,085 | B2 | * | 5/2006 | Hoey-Slocombe .... | A47G 9/068 297/219.12 |
| 8,109,524 | B1 | * | 2/2012 | Toohey ................... | B62B 5/069 280/33.992 |
| 2002/0092132 | A1 |   | 7/2002 | Kessler |              |
| 2005/0029760 | A1 | * | 2/2005 | Lohman ................. | B62B 3/144 280/33.992 |
| 2008/0303230 | A1 |   | 12/2008 | Somberg |            |
| 2009/0184146 | A1 | * | 7/2009 | Diccianni ............... | A45C 3/04 224/411 |
| 2011/0148056 | A1 |   | 6/2011 | Niernberger |         |

FOREIGN PATENT DOCUMENTS

WO    WO2007114718 A1    10/2007

\* cited by examiner

*Primary Examiner* — Brian Swenson

(57) ABSTRACT

The shopping cart handle cover is a reusable protective cover that is adapted for use with shopping cart. When extended, the shopping cart handle cover is used to cover the handle. When not in use, the shopping cart handle cover is folded in to a compact form and is stored in a bag that is attached to the shopping cart handle cover. The shopping cart handle cover comprises a handle cover, a pocketed member, a storage bag, and a one or more hook and loop fasteners.

1 Claim, 8 Drawing Sheets

SHOPPING CART HANDLE COVER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of layered covers for transport devices, more specifically, a reusable fabric cover adapted for use with shopping carts.

Summary of Invention

The shopping cart handle cover is a reusable protective cover that is adapted for use with shopping cart. When extended, the shopping cart handle cover is used to cover the handle and descends behind a shopping cart in order for pockets to store items therein. When not in use, the shopping cart handle cover is folded in to a compact form and is stored in a bag that is attached to the shopping cart handle cover.

These together with additional objects, features and advantages of the shopping cart handle cover will be readily apparent to those of ordinary skill in the art upon reading the following detailed description of the presently preferred, but nonetheless illustrative, embodiments when taken in conjunction with the accompanying drawings.

In this respect, before explaining the current embodiments of the shopping cart handle cover in detail, it is to be understood that the shopping cart handle cover is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the shopping cart handle cover.

It is therefore important that the claims be regarded as including such equivalent construction insofar as they do not depart from the spirit and scope of the shopping cart handle cover. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
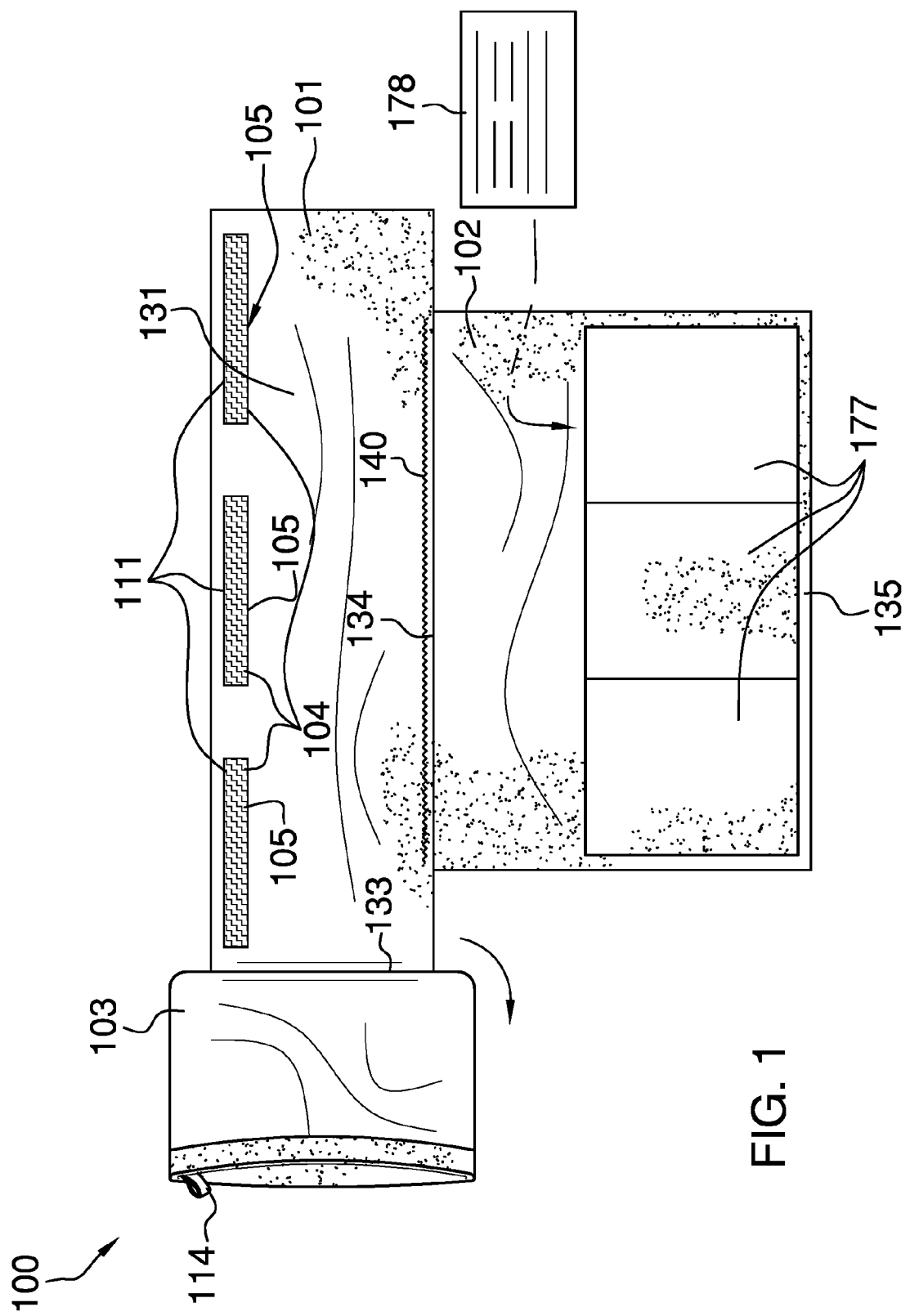
FIG. 1 is a front view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 11. The shopping cart handle cover 100 (hereinafter invention) comprises a handle cover 101, a pocketed member 102, a storage bag 103, and a first one or more hook and loop fasteners 104, and a second one or more hook and loop fasteners 105.

The handle cover 101 is a first rectangular shaped textile 121 that is further defined with a first front side 131, a first rear side 132, a first sewn side 133, and a second sewn side 134. The pocketed member 102 is a second rectangular shaped textile 122 that is further defined with a second front side 135 and a second rear side 136. The storage bag 103 is a bag formed from a third rectangular shaped textile 121. The third rectangular shaped textile 123 is further defined with a first side 141, a second side 142, a third side 143 and a fourth side 144.

The first one or more hook and loop fasteners 104 further comprises a first one or more hook or loop surfaces 111 and a second one or more hook or loop surfaces 112. The second one or more hook and loop fasteners 105 further comprises a third one or more hook or loop surfaces 113. The third one or more hook or loop surfaces 113 are adapted to work with the first one or more hook or loop surfaces 111.

Figure 8:
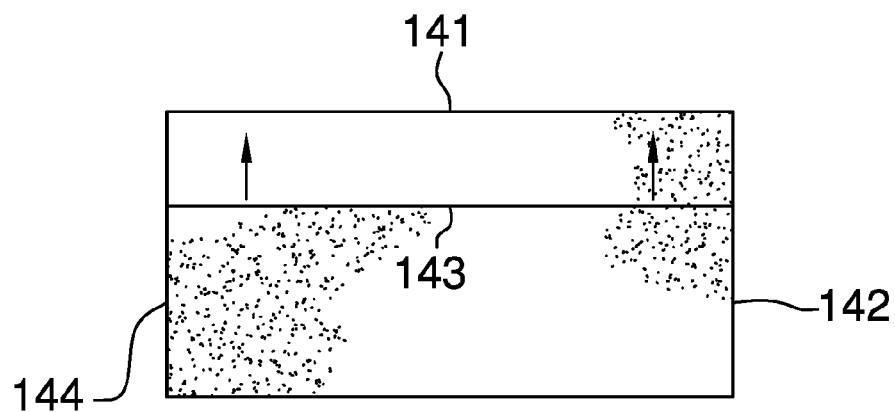
FIG. 8 is a detail view of an embodiment of the disclosure.
Figure 9:
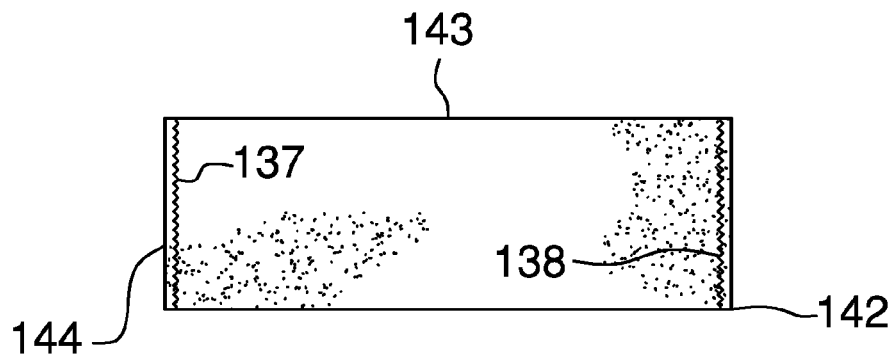
FIG. 9 is a detail view of an embodiment of the disclosure.
Figure 10:
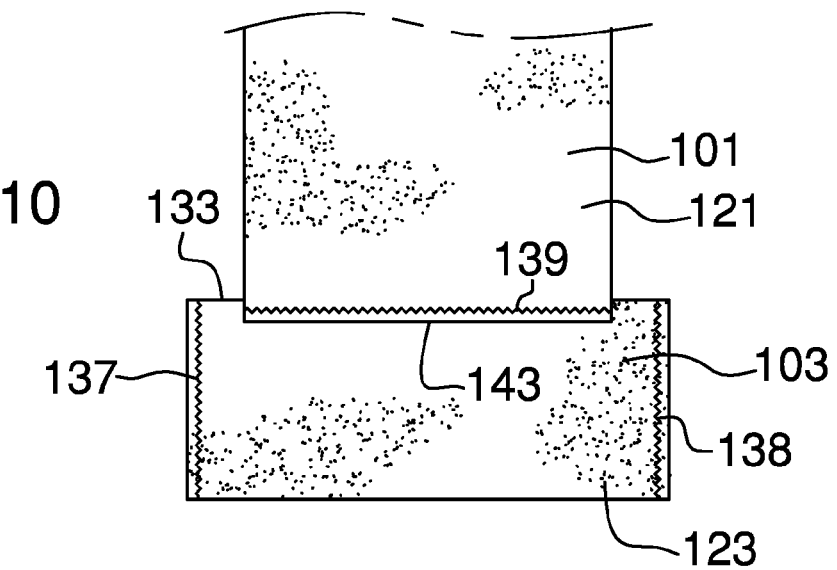
FIG. 10 is a detail view of an embodiment of the disclosure.
Figure 11:
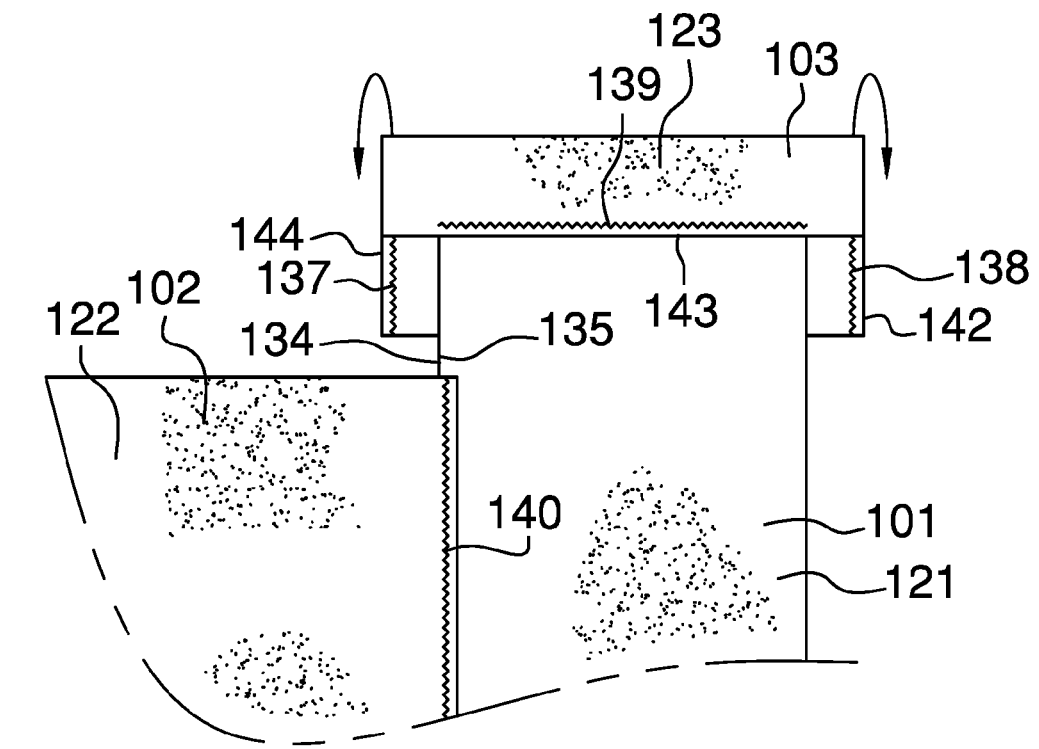
FIG. 11 is a detail view of an embodiment of the disclosure.

As shown in FIGS. 7 through 10, the third rectangular shaped textile 123 is formed into the storage bag 103 as follows. As shown in FIG. 8, the third side 143 of the third rectangular shaped textile 123 is folded up to the first side 141 of the third rectangular shaped textile 123. As shown in FIG. 9, the fourth side 144 is sewn to itself using a first sewn seam 137. The second side 142 is sewn to itself using the second sewn seam 138. Where the first side 141 and the third side 143 meet is where the opening of the storage bag 103 is formed. As shown in FIG. 10, the first sewn side 133 of the first rectangular shaped textile 121 is sewn using a third sewn seam 139 to the third side 143 of the third rectangular shaped textile 123. As shown in FIG. 11, the first sewn seam 137 and the second sewn seam 138 are hidden when the opening formed by the first side 141 and the third side 143 is turned over the storage bag 103 to turn the storage bag 103 inside out. To complete the storage bag 103, a keyring loop 114 is sewn into the opening formed by the first side 141 and the third side 143 of the third rectangular shaped textile 123.

As shown in FIGS. 1 and 11, the second sewn side 134 of the first rear side 132 of the first rectangular shaped textile 121 is attached to the second front side 135 of the second rectangular shaped textile 122 using the fourth sewn seam 140.

Figure 2:
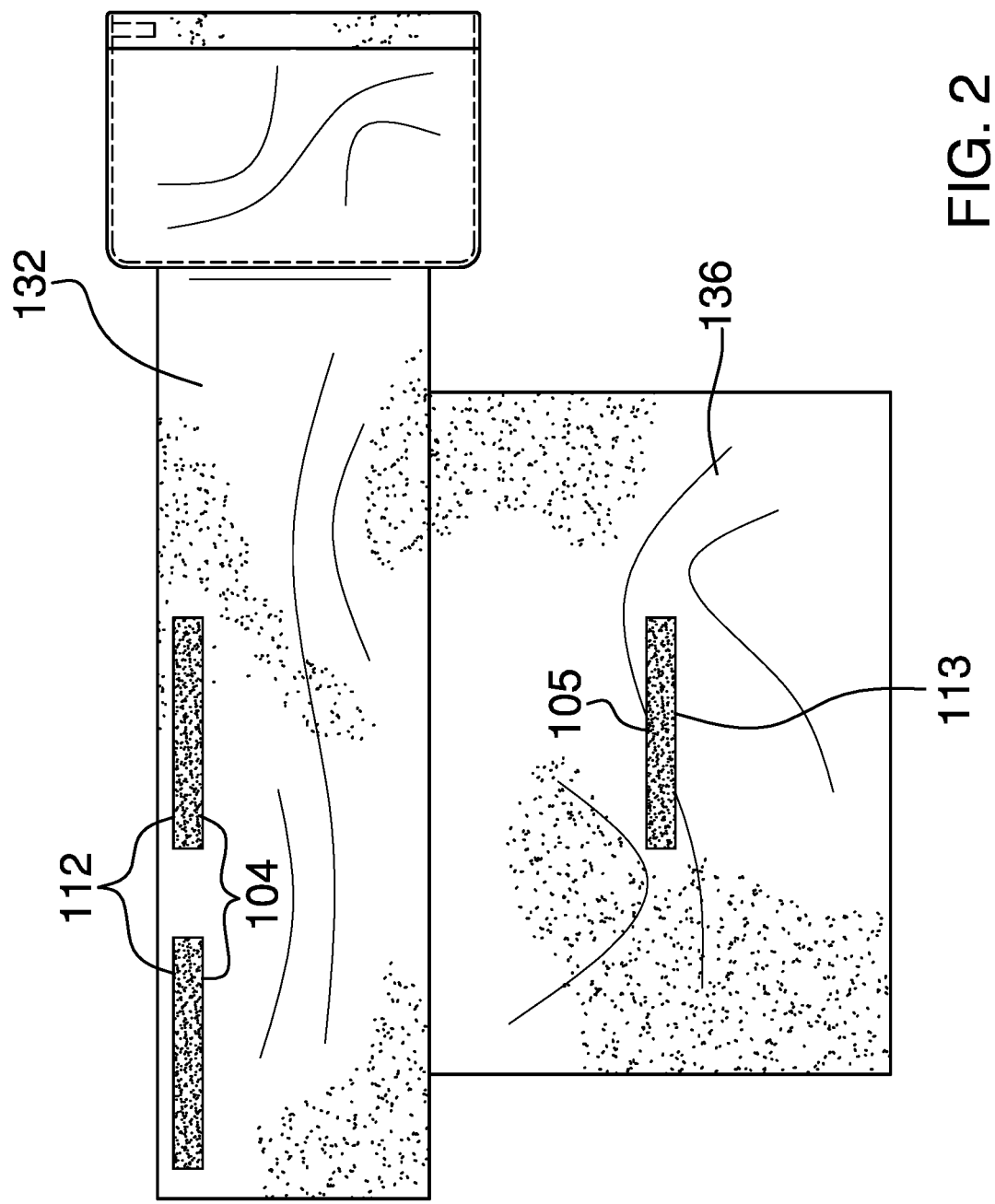
FIG. 2 is a back view of an embodiment of the disclosure.

As shown in FIG. 1, the first one or more hook or loop surfaces 111 are sewn or glued to the first front side 131 of the handle cover 101. As shown in FIG. 2, the second one or more hook or loop surfaces 112 are sewn or glued to the first rear side 132 of the handle cover 101. The second one or more hook or loop surfaces 112 are selected to match with the first one or more hook or loop surfaces 111 to form the first one or more hook and loop fasteners 104. As also shown in FIG. 2, the third one or more hook or loop surfaces 113 are sewn or glued to the second rear side 136 of the pocketed member 102. The third one or more hook or loop surfaces 113 are selected to match the with the first one or more hook or loop surfaces 111 to form the second one or more hook and loop fasteners 105.

Figure 6:
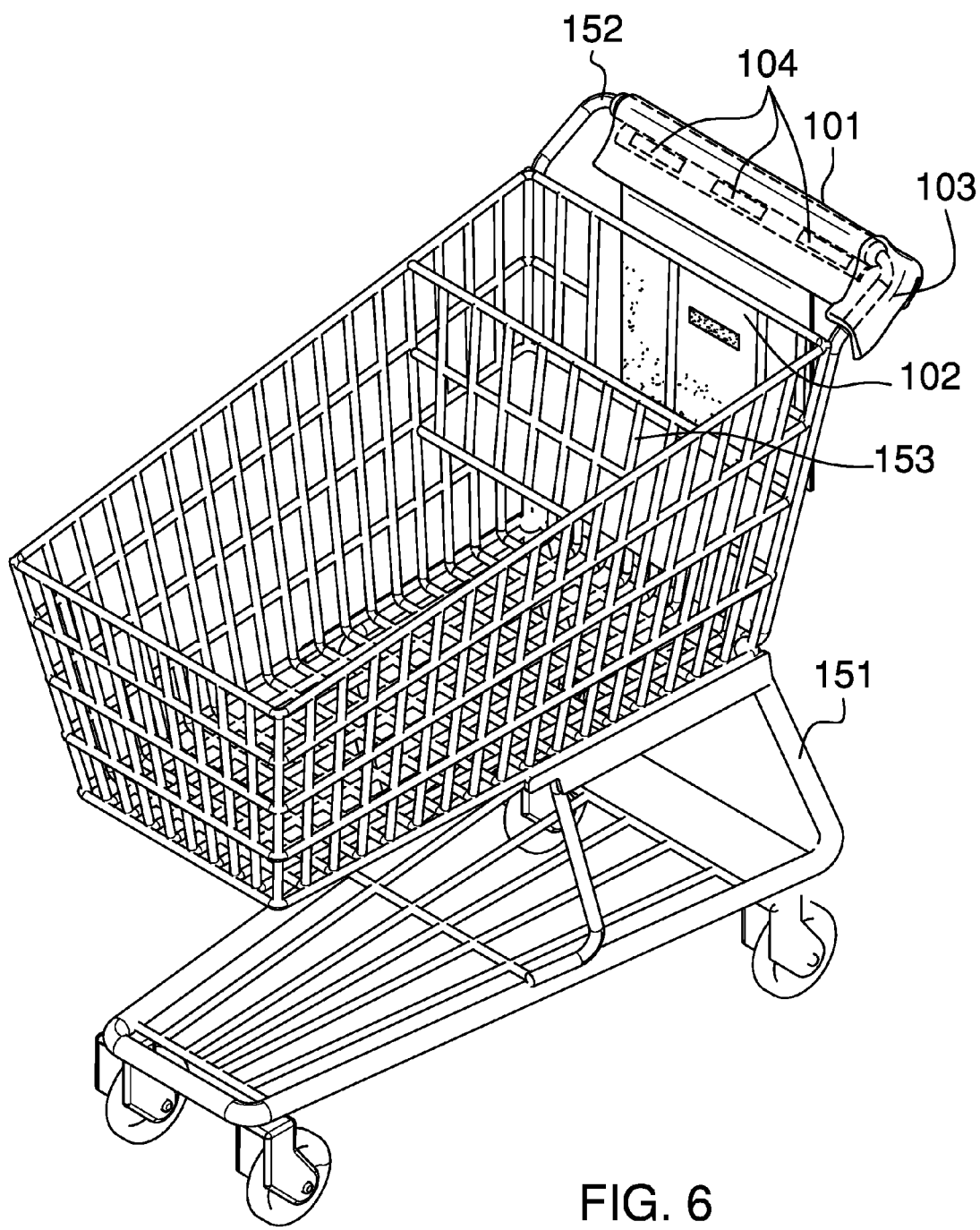
FIG. 6 is an in use view of an embodiment of the disclosure.
Figure 7:
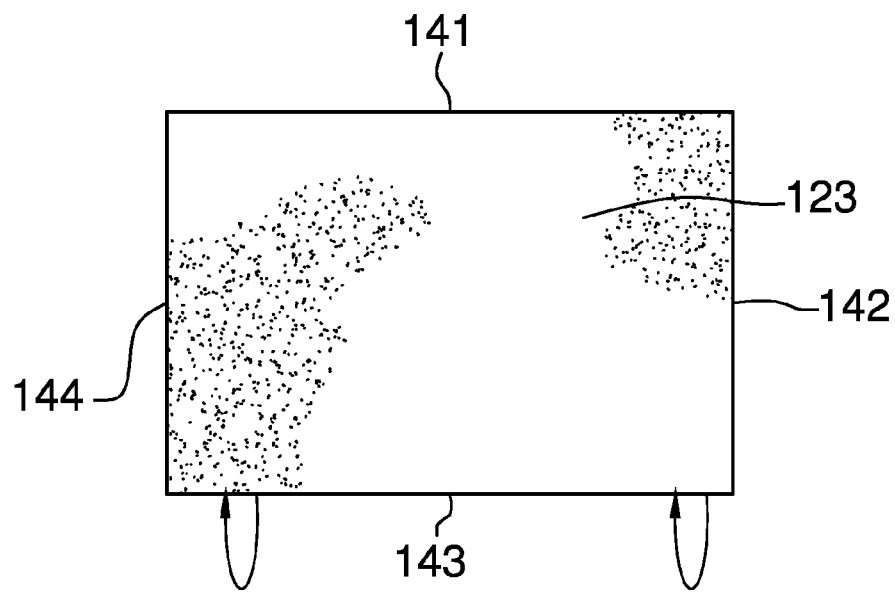
FIG. 7 is a detail view of an embodiment of the disclosure.

As shown in FIG. 6, to use the invention 100 the handle cover 101 is wrapped around the handle 152 of the shopping cart 151 such that the second one or more hook or loop surfaces 112 are aligned with the first one or more hook or loop surfaces 111. By pressing the second one or more hook or loop surfaces 112 against the first one or more hook or loop surfaces 111 the handle cover 101 is secured to the handle 152 of the shopping cart 151.

The handle cover 101 is attached to the handle 152 of the shopping cart 151 such that the pocketed member 102 hangs below the handle 152, but behind the child seat 153 of the shopping cart 151. The pocket member 102 includes a plurality of pockets 177 on the second front side 135. The plurality of pockets 177 enable a multitude of items 178 to be stored within the plurality of pockets 177 whilst said pocket member 102 hangs below the handle 152 of the shopping cart 151.

Figure 3:
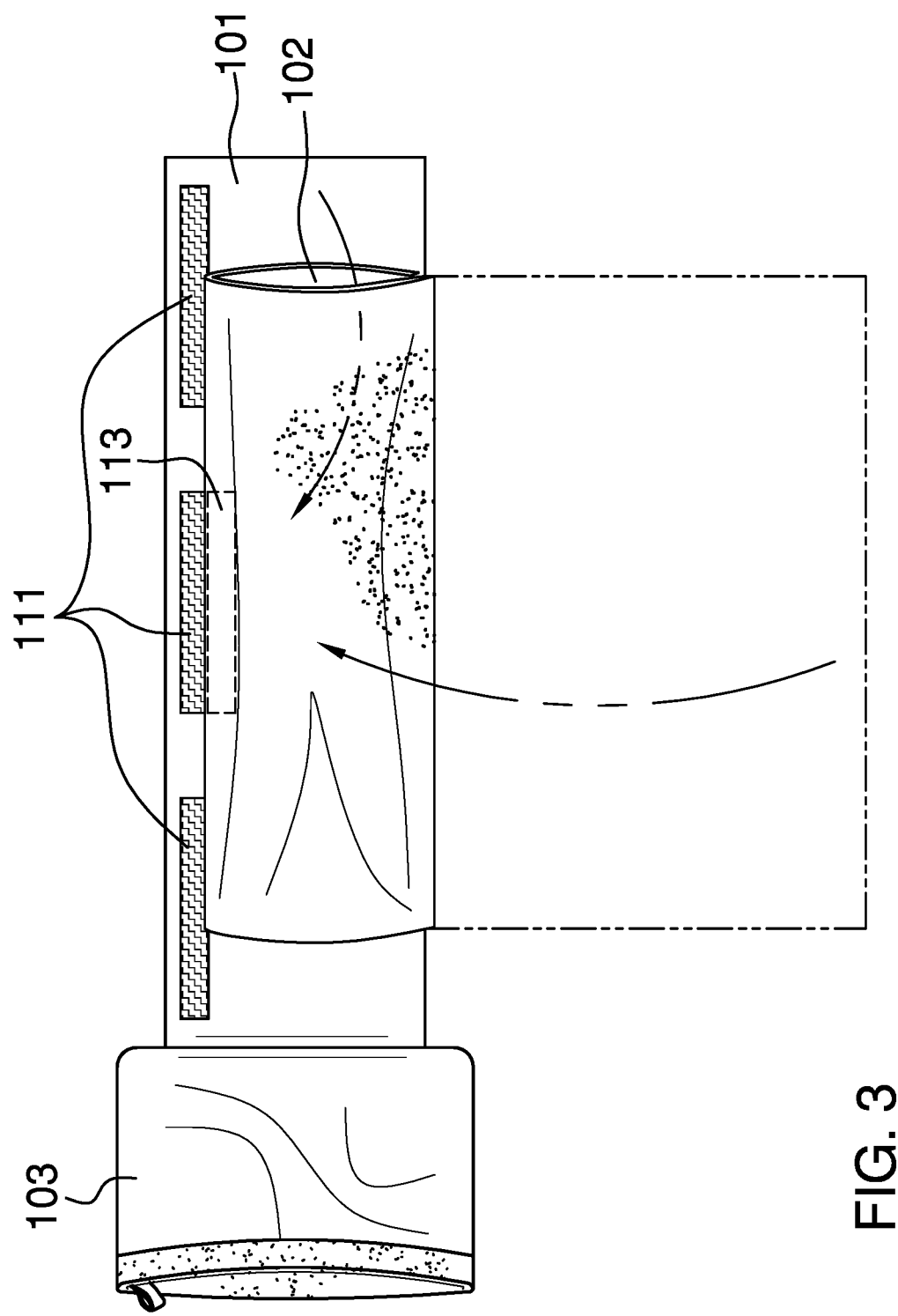
FIG. 3 is an in-use view of an embodiment of the disclosure.
Figure 4:
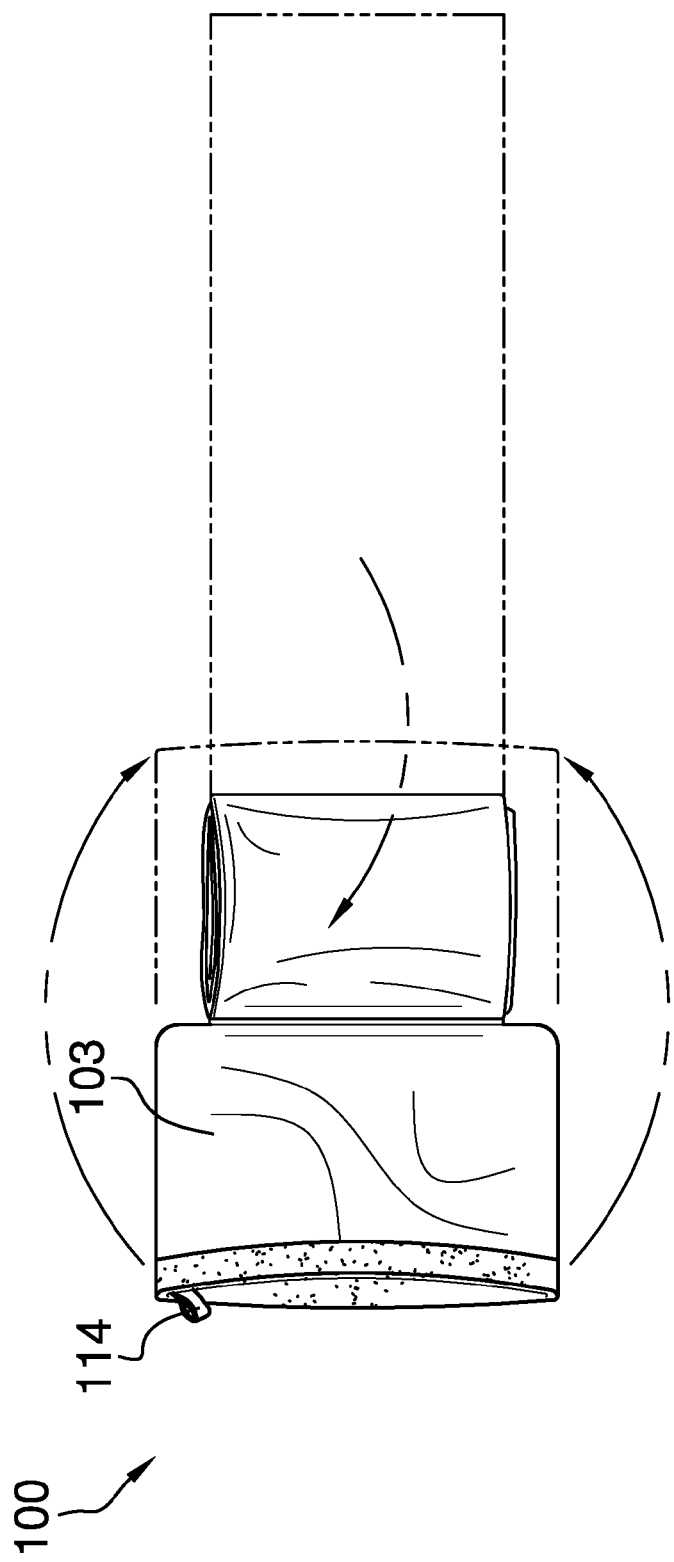
FIG. 4 is an in use view of an embodiment of the disclosure.
Figure 5:
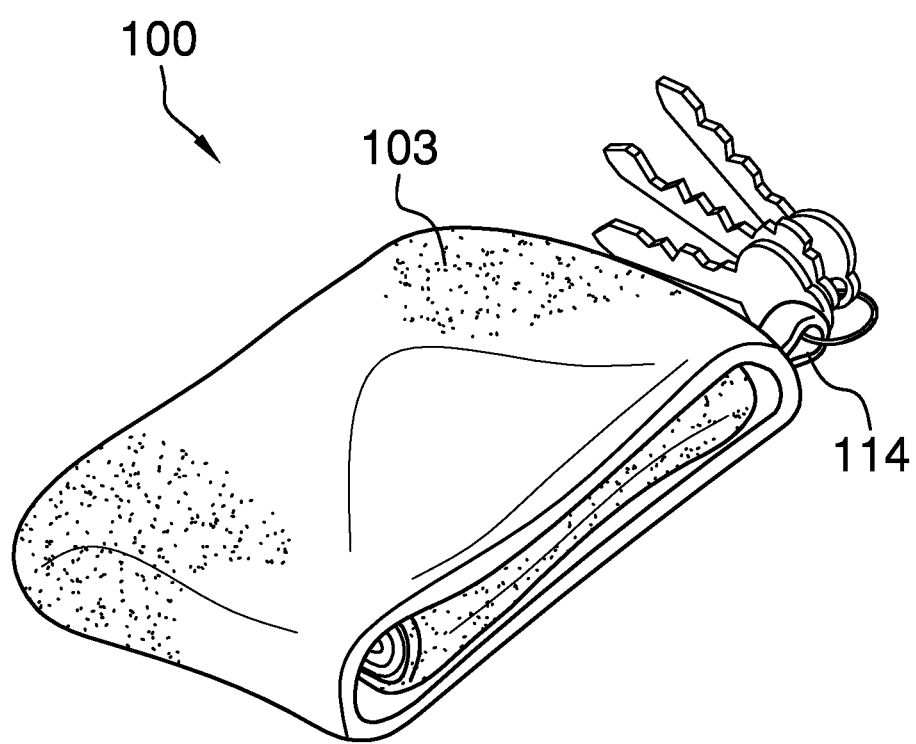
FIG. 5 is a detail view of an embodiment of the disclosure.

As shown in FIG. 3, to fold the invention 100 the pocketed member 102 is folded such that the third one or more hook or loop surfaces 113 is aligned with the first one or more hook or loop surfaces 111 such that the third one or more hook or loop surfaces 113 and the first one or more hook or loop surfaces 111 join to fasten the pocketed member 102 to the handle cover 101. The end of the handle cover 101 that is distal from the first sewn side 133 is then folded such that the second one or more hook or loop surfaces 112 aligns with a portion of the first one or more hook or loop surfaces 111 to hold the folded handle cover 101 in the folded position. The handle cover 101 is then rotated around the third sewn seam 139 and placed in the storage bag 103.

The first rectangular shaped textile 121, the second rectangular shaped textile 122, and the third rectangular shaped textile 123 are commercially available. The first one or more hook and loop fasteners 104 and the second one or more hook and loop fastener 105 are readily and commercially available. Methods to sewn the sewn seams and to attach hook and loop fasteners to textiles are well known and documented in the art.

The following definitions were used in this disclosure:

Hook and Loop Fastener: As used in this disclosure, a hook and loop fastener is a fastener that comprises a hook surface and a loop surface. The hook surface comprises a plurality of minute hooks. The loop surface comprises a surface of uncut pile that acts like a plurality of loops. When the hook surface is applied to the loop surface, the plurality of minute hooks fasten to the plurality of loops securely fastening the hook surface to the loop surface. A note on usage: when fastening two objects the hook surface of a hook and loop fastener will be placed on the first object and the matching loop surface of a hook and loop fastener will be placed on the second object without significant regard to which object of the two objects is the first object and which of the two objects is the second object. When the hook surface of a hook or loop fastener or the loop surface of a hook and loop fastener is attached to an object this will simply be referred to as the "hook or loop surface" with the understanding that when the two objects are fastened together one of the two objects will have a hook surface and the remaining object will have the loop surface.

Sheeting: As used in this disclosure, sheeting is a material, such as cloth or plastic, in the form of a thin flexible layer or layers that is used to cover something.

Textile: As used in this disclosure, a textile is a material that is woven, knitted, or felted. Synonyms in common usage for this definition include fabric and cloth.

With respect to the above description, it is to be realized that the optimum dimensional relationship for the various components of the invention described above and in FIGS. 1 through 11, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A cover comprising:
 a handle cover, a pocketed member, a storage bag, and a plurality of hook and loop fasteners;
 wherein the cover is adapted for use with a shopping cart;
 wherein the cover is reusable;
 wherein the cover is adapted to cover the handle of the shopping cart;
 wherein the handle cover is a first rectangular shaped textile that is further defined with a first front side, a first rear side, a first sewn side, and a second sewn side;
 wherein the pocketed member is a second rectangular shaped textile that is further defined with a second front side and a second rear side;
 wherein the storage bag is a bag formed from a third rectangular shaped textile;
 wherein the third rectangular shaped textile is further defined with a first side, a second side, a third side and a fourth side;

wherein the plurality of hook and loop fasteners further comprises a first one or more hook and loop surfaces, and a second one or more hook and loop surfaces;

wherein the second one or more hook and loop surfaces further comprises a third one or more hook or loop surfaces;

wherein the third one or more hook or loop surfaces is designed to work with the first one or more hook or loop surfaces;

wherein the third side of the third rectangular shaped textile is folded up to the first side of the third rectangular shaped textile;

wherein the fourth side is sewn to itself using a first sewn seam;

wherein the second side is sewn to itself using a second sewn seam;

wherein the storage bag further comprises a pocket;

wherein the first sewn side of the first rectangular shaped textile is sewn using a third sewn seam to the third side of the third rectangular shaped textile;

wherein the second sewn side of the first rear side of the first rectangular shaped textile is attached to the second front side of the second rectangular shaped textile using a fourth sewn seam;

wherein the first one or more hook or loop surfaces are attached to the first front side of the handle cover;

wherein the second one or more hook or loop surfaces are attached to the first rear side of the handle cover;

wherein the third one or more hook or loop surfaces are attached to the second rear side;

wherein the pocketed member is further defined as a second rectangular shaped textile;

wherein the pocketed member is further defined with a second front side and a second rear side;

wherein the handle cover is adapted to be attached to the handle of the shopping cart such that the pocketed member hangs below the handle, but behind a child seat of the shopping cart;

wherein the pocket member includes a plurality of pockets on the second front side;

wherein the plurality of pockets enable a multitude of items to be stored within the plurality of pockets whilst said pocket member adaptively hangs below the handle of the shopping cart.

\* \* \* \* \*